July 2, 1957 R. O. BRADLEY 2,797,794
CONVEYOR BELT GUIDE
Filed July 22, 1952 3 Sheets-Sheet 1
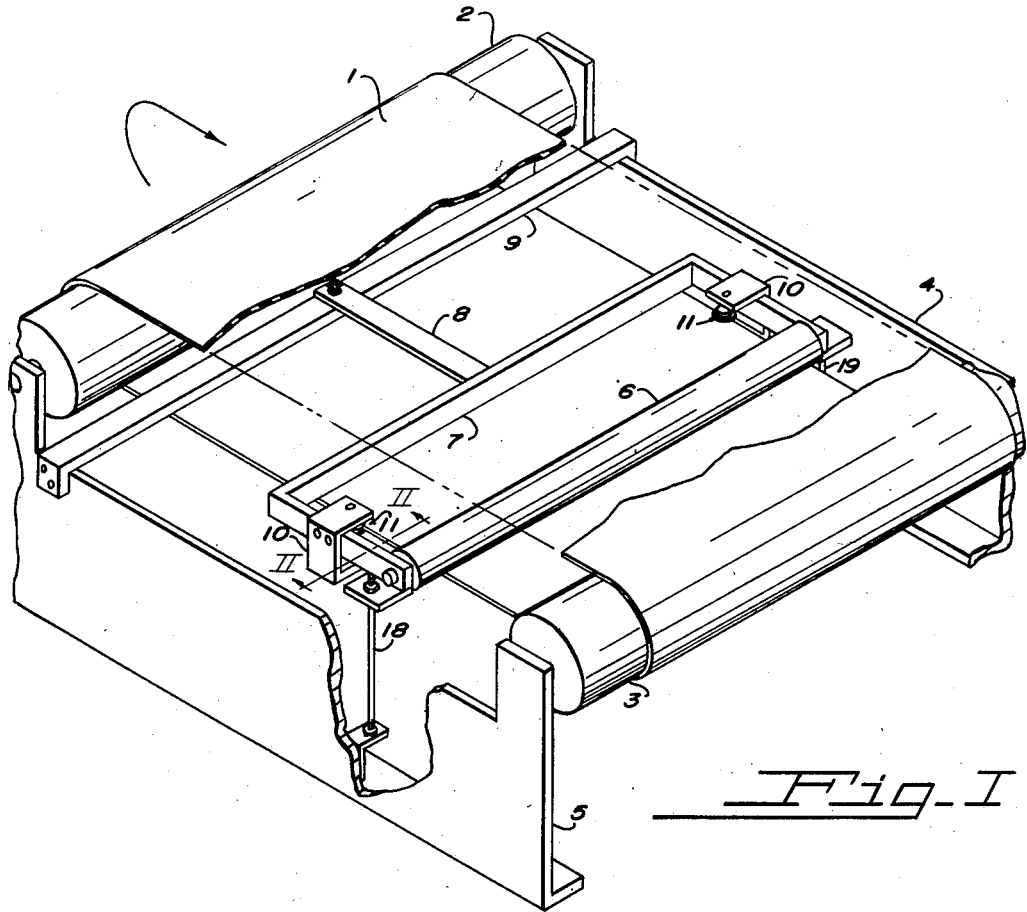
Fig. I
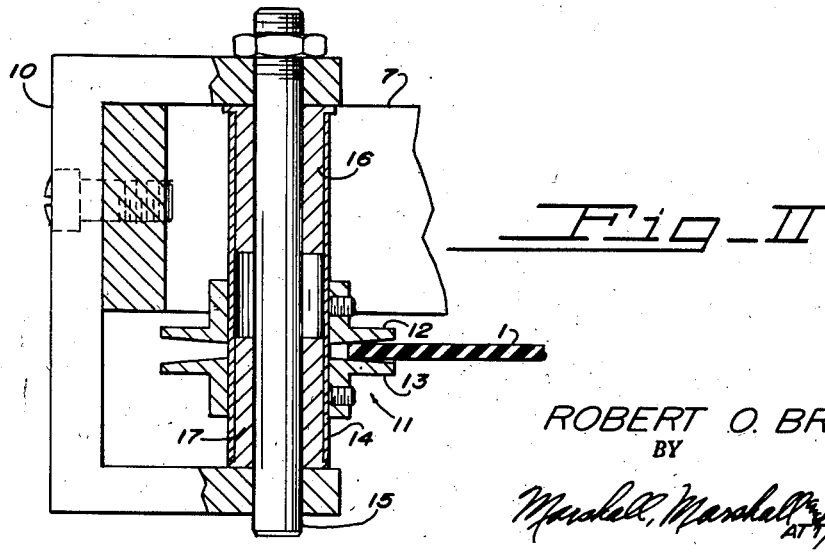
Fig. II
INVENTOR.
ROBERT O. BRADLEY
BY
ATTORNEYS

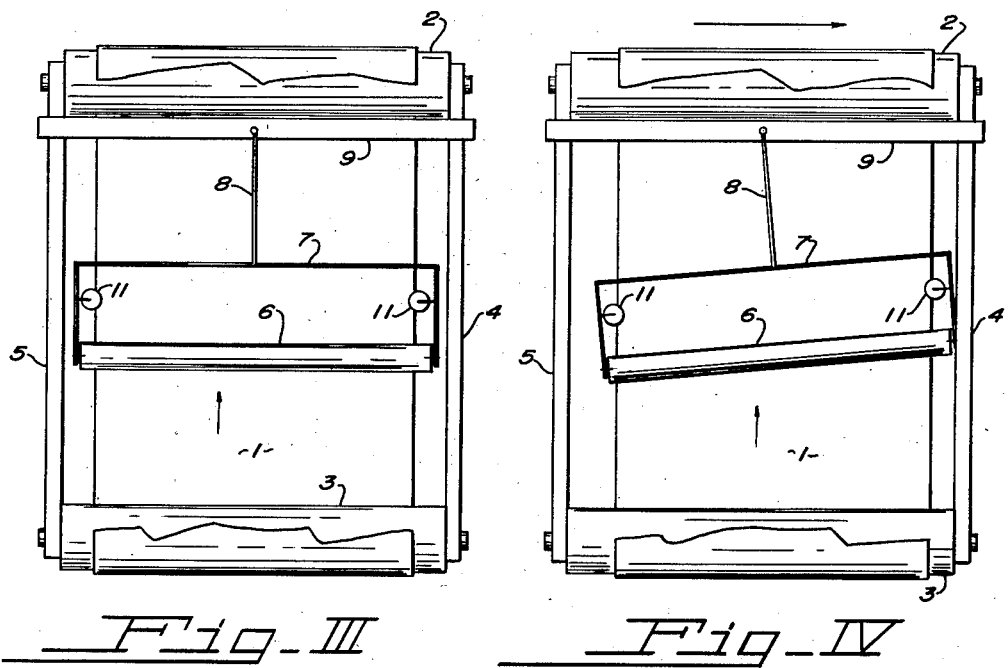
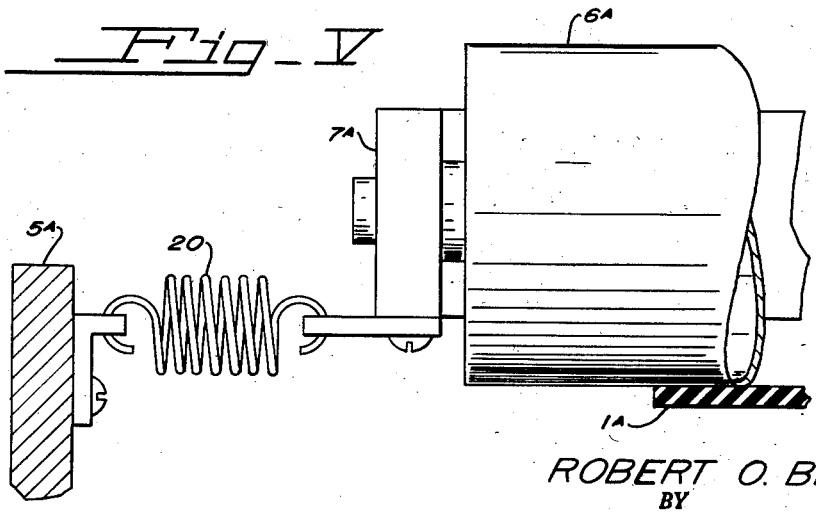

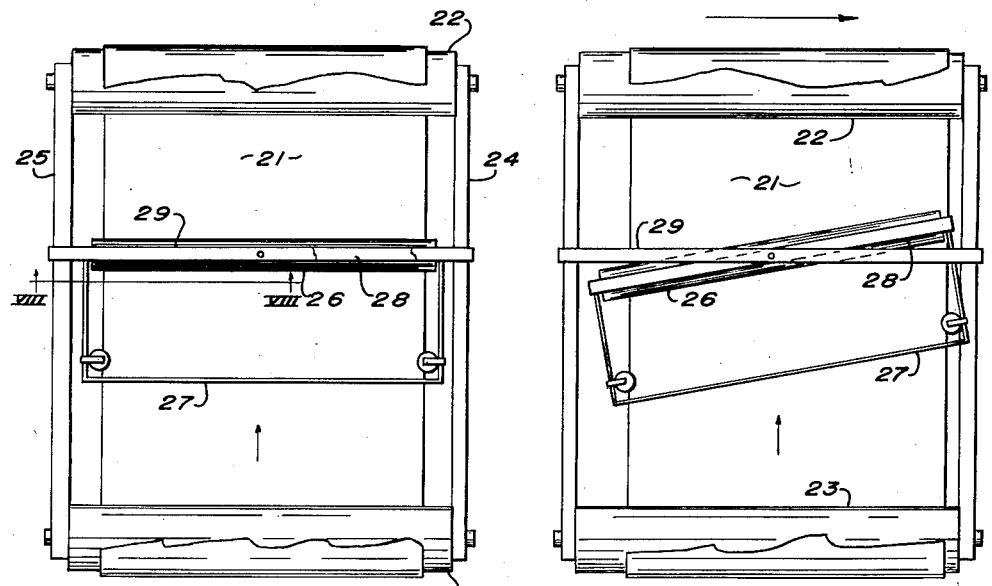
Fig. VI   Fig. VII
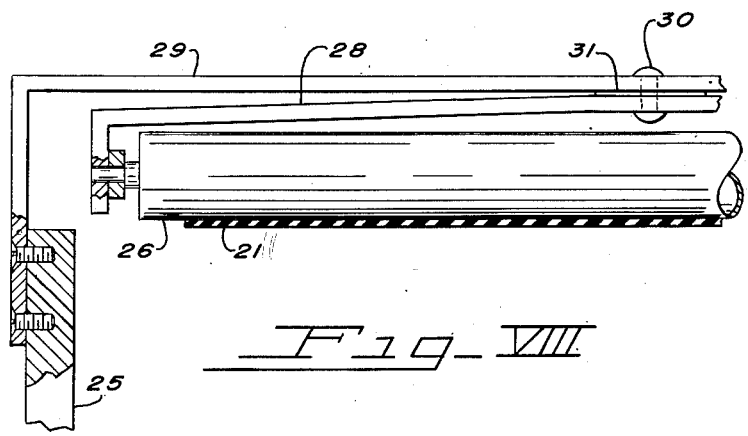
Fig. VIII
INVENTOR.
ROBERT O. BRADLEY
BY
ATTORNEYS

United States Patent Office 2,797,794
Patented July 2, 1957

2,797,794

CONVEYOR BELT GUIDE

Robert O. Bradley, Toledo, Ohio, assignor to Toledo Scale Company, Toledo, Ohio, a corporation of New Jersey Application July 22, 1952, Serial No. 300,191

2 Claims. (Cl. 198—202)

This invention relates to guides for conveyor belts and in particular to guides arranged to keep relatively short, wide conveyor belts centrally located on cylindrical pulleys.

It is customary to crown pulleys that are used with long, flat belts. The crown of the pulley cooperating with the elasticity of the belt causes the belt to maintain itself centered on the crowned pulley even though a slight misalignment of the pulleys exists. However, if the belt is short as when a short, flat, wide belt is used as a short conveyor it is no longer possible to secure enough correcting force from any allowable crowning of the pulleys to keep the belt centered. In fact, with a short, wide belt the crowning tends to overstress the center part of the belt without yielding any substantial corrective force.

The force required to prevent a short, wide belt from creeping sideways on cylindrical pulleys is so large that any rollers arranged to engage the side edge of the belt turn and wear the edge of the belt before they exert sufficient force to keep the belt centered.

The principal object of this invention is to provide a belt guiding arrangement that supplies substantial force distributed across the width of the belt and directed so that the belt is continually urged toward its center position on the cylindrical pulleys whenever it tends to stray or creep in one direction or the other.

Another object of the invention is to provide a corrective device that applies to the belt a corrective force that is quite large and that tends to return the belt toward center at a rate that is generally proportional to the distance that the belt has strayed from its central position.

A still further object of the invention is to provide means whereby the magnitude of the corrective effort may be made generally proportional to the distance that the belt has strayed from its midposition.

More specific objects and advantages of the invention are apparent from the following description of structure that operates according to the invention.

According to the invention a correction roller is arranged to run on a portion of the belt as it approaches one of the pulleys and the roller is swiveled about an axis perpendicular to the belt so that the roller tends to run diagonally across the belt and off the belt in the same direction that the belt has crept sideways on the pulleys. The correction roller is restrained so that as it tries to run toward the side of the belt against the restraining force it applies a reaction force to the belt tending to drive the belt back toward its central position on the pulleys. The correction roller is preferably made somewhat longer than the width of the belt and bears more or less uniformly across the entire width of the belt so that the correction forces are applied across the entire width of the belt rather than against one edge. The angle at which the correction roller runs on the belt is determined by a pair of guide rollers or guide pulleys that engage the edges of the belt and swivel the correction roller as the belt tends to creep sideways.

Preferred embodiments of the invention are illustrated in the accompanying drawings.

In the drawings:

Figure I is a simplified isometric view of a short conveyor belt assembly equipped with a correction roller according to the invention. Parts of the conveyor belt and framework are cut away to show details of construction.

Figure II is a greatly enlarged section of one of the guide pulleys as seen from the line II—II of Figure I.

Figure III is a simplified plan view of the improved conveyor showing the positions of the parts when the conveyor belt is running centrally on the pulleys.

Figure IV is a similar plan view showing the arrangement of the parts when the conveyor belt has crept sideways a substantial distance from its correct central position.

Figure V is a greatly enlarged, fragmentary, sectional view showing one method of applying restoring force to a yoke journaling the correction roller.

Figure VI is a simplified plan view of a second embodiment of the invention showing the position of the parts when the conveyor belt is running in its central position.

Figure VII is a similar plan view of the second embodiment of the invention showing the position of the parts when the belt has crept sideways a substantial distance from its central position.

Figure VIII is an enlarged, fragmentary, vertical section taken substantially along the line VIII—VIII of Figure VI.

These specific figures and the accompanying description are intended to merely illustrate the invention but not to limit its scope.

In a conveyor constructed according to the invention a short, wide conveyor belt 1 is trained over a pair of cylindrical pulleys 2 and 3 which in turn are journaled in side frames 4 and 5. If no means are employed to keep the conveyor belt 1 centered on the pulleys 2 and 3 the belt tends to creep one way or the other and no fixed adjustment will hold the belt in a central position on the pulleys. Accordingly a correction roller 6 that is journaled in a yoke 7 is arranged to run on the top side of the lower run of the conveyor belt. The yoke 7 includes a tongue 8 that is pivotally connected to a cross member 9 extending between the side frames 4 and 5 and between the upper and lower runs of the belt. The upper run of the belt is used for conveying material and therefore is kept relatively flat between the cylindrical pulleys 2 and 3.

The yoke 7 is, near the ends of the correction roller 6, provided with guides 10 (see also Figure II) each of which includes a V-pulley 11 arranged to engage an edge of the conveyor belt 1. Each guide pulley 11 comprises an upper flange 12 and a lower flange 13 that are adjustably secured on a rotatable sleeve 14 journaled on a vertical axle 15 mounted in the frame of the guide 10. The rotatable sleeve 14 includes a pair of bushings or bearings 16 which reduce the friction between the sleeve and the axle so that the guide pulleys 11 may rotate easily when engaged with the belt.

Referring again to Figure I the correction roller 6 is held firmly in engagement with the conveyor belt 1 by a pair of tension links 18 and 19 connected between the ends of the yoke 7 and portions of the side frames 4 and 5.

As shown in Figure I, the direction of travel of the upper run of the belt is from the first pulley 2 forward toward the pulley 3, and the direction of the lower run of the belt is from the pulley 3, under the correction roller 6, and to the first cylindrical pulley 2.

Referring now to Figure III, the yoke 7 and correction roller 6 are shown in the position that they occupy when the belt is running centrally on the pulleys 2 and 3. In this position the axis of the correction roller 6 is parallel to the cylindrical pulleys 2 and 3 so that no lateral force is exerted on the belt 1.

Figure IV shows the yoke 7 and correction roller 6 in the positions they occupy when the belt 1 has crept sideways to the right on the pulleys 2 and 3. As shown in this figure the right hand edge of the belt by engagement with the right hand guide pulley 11 has rotated or swiveled the yoke 7 toward the right so that the roller 6 tends to run diagonally across the belt toward the right side. In other words the axis of the correction roller 6 is no longer parallel to the cylindrical pulleys 2 and 3. As the correction roller 6 tends to run diagonally across the belt 1 it draws the left hand guide pulley 11 against the edge of the belt so that the roller and yoke cannot overtravel and run off the belt. At the same time the lateral movement of the yoke 7 inclines the tension links 18 and 19 so that these links, in addition to pulling down on the yoke to hold the correction roller 6 on the belt, exert a lateral force generally proportional to the lateral deflection on the yoke tending to pull it back toward its central position. Since the links 18 and 19, when inclined, exert a lateral force proportional to the lateral deflection of the yoke they are equivalent to laterally directed springs and may be said to exert a resilient restoring force. A balance of forces is maintained between the lateral component of force of the tension links 18 and 19 tending to return the yoke 6 and the attempt of the now swiveled correction roller 6 to run diagonally across the belt in the same direction that the belt has crept on the cylindrical pulleys 2 and 3. The reaction force of the correction roller 6 on the belt 1 urges the belt back toward its central position on the pulleys 2 and 3.

The amount of force developed between the correction roller and the belt depends upon the characteristics of the surfaces of each. If the belt and roller are each of a hard non-yielding material a relatively large lateral force is developed for very slight swiveling of the correction roller axis. An ordinary conveyor belt is faced with rubber on each side, the rubber being relatively soft and tough so that it does not wear appreciably when subjected to rough usage. Because of the elasticity of the rubber face of the belt, the face will yield elastically in shear while it is in contact with the correction roller to accommodate small amounts of swiveling of the correction roller axis. In this range of operation the lateral force exerted between the belt and correction roller is roughly proportional to the angle through which the correction roller is swiveled. This force increases with increase in swiveling angle until a point is reached at which the correction roller actually slides on the belt as it is prevented from running diagonally toward the edge.

Figure V shows another way which the yoke may be resiliently restrained. As shown in this figure a yoke 7a journaling a roller 6a is connected through a short helical tension spring 20 to a side frame 5a of the conveyor assembly. A similar spring is used on the other side of the yoke. The springs 20 take the place of or may be used in addition to the tension links 18 and 19 to provide restoring force tending to hold the yoke in its midposition with the roller axis parallel to the pulleys.

It is not necessary that the correction roller be located in advance of the point about which the yoke swivels. The only requirement is that the yoke shall swivel so that the correction roller tends to run diagonally across the belt in the direction that the belt has strayed on the pulleys and that the yoke be restrained from moving sideways.

In the conveyor shown in Figure VI a belt 21 is shown running on a pair of cylindrical pulleys 22 and 23 that are journaled in side frames 24 and 25. A correction roller 26, arranged to run on the lower run of the belt 21, is journaled in a yoke 27 that includes a cross member 28 (Figure VIII) pivotally connected near its center to a cross bar 29 spanning the space between the side frames 24 and 25. The pivotal connection between the yoke cross member 28 and the frame cross bar 29 consists of a king bolt 30 and washer 31 serving as a fifth wheel to permit the yoke to swivel like the front axle of a wagon without allowing it to tip appreciably. Guide pulleys 32 and 33 mounted in a forwardly extending portion of the yoke 27 engage the edges of the belt 21 and by such engagement swivel the yoke 27 through angles that are generally proportional to the amount that the conveyor belt 21 creeps sideways on the pulleys 22 and 23.

In this example as in the first the correction roller is arranged to bear heavily on the conveyor belt so that substantial force may be transmitted therebetween before the roller slides on the belt.

In this example as in the first the correction roller is swiveled while it runs on the conveyor belt so that it tends to run diagonally across the belt whenever the belt creeps sideways from its true central position. In each arrangement the correction roller is journaled in a yoke that is restrained from lateral movement either by the springs or tension links shown in the first example or the king bolt 30 of the second example so that the yoke and roller cannot freely move sideways across the belt. Because of this restraint any attempt of the correction roller to run diagonally across the belt produces a reaction force urging the belt back toward its central position on the cylindrical pulleys.

Since the correction force applied to the conveyor belt to urge it toward its central position is distributed across the width of the belt the force may be quite large without producing any added wear on the belt. Likewise the positioning of the guide pulleys 11 of the first example or the guide pulleys 32 and 33 of the second example well in advance of the pivot point about which the yoke swivels permits the guide pulleys to swivel the yoke without exerting much force against the edges of the belt.

Correction rollers for guiding wide flat belts according to the invention permit such belts to be operated on closely spaced cylindrical pulleys without damage to the belt and without requiring extremely high accuracy in alignment of the cylindrical pulleys.

Various modifications of the correction roller and its yoke and the means for mounting and guiding the yoke may be made without departing from the scope of the invention.

Having described my invention, I claim:

1. In a device of the class described, in combination, a flat conveyor belt, a cylindrical pulley over which the belt is trained, a roller running on an approaching section of the belt, a yoke that journals the ends of the roller, means for pivotally mounting said yoke for rotation about an axis generally perpendicular to the belt and located between the roller and the cylindrical pulley, guide means mounted on the yoke and engaging the edges of the belt adjacent the roller with the pivot axis intermediate the guide means and the cylindrical pulley and resilient means urging the yoke toward its central position.

2. In a device of the class described, in combination, a frame, a pair of parallel cylindrical pulleys journaled in the frame, a flat belt running on the pulleys, a roller running on the belt intermediate the pulleys, a yoke journaling the ends of the roller, means for pivotally mounting the yoke at a point intermediate the roller and the pulley next to receive the belt, guide means attached to the yoke and engaging the edges of the belt to rotate the yoke as the belt creeps sideways on the pulleys, and a pair of tension links connecting the ends of the yoke to the frame for holding the roller against the belt, said links being substantially perpendicular to the belt when said yoke is centered.

References Cited in the file of this patent

UNITED STATES PATENTS

| | | |
|---|---|---|
| 752,202 | Chritton | Feb. 16, 1904 |
| 2,160,057 | Carus et al. | May 30, 1939 |
| 2,532,987 | Berndt | Dec. 5, 1950 |
| 2,553,473 | Reimel | May 15, 1951 |

FOREIGN PATENTS

| | | |
|---|---|---|
| 678,956 | France | Jan. 2, 1930 |